Patented June 4, 1929.

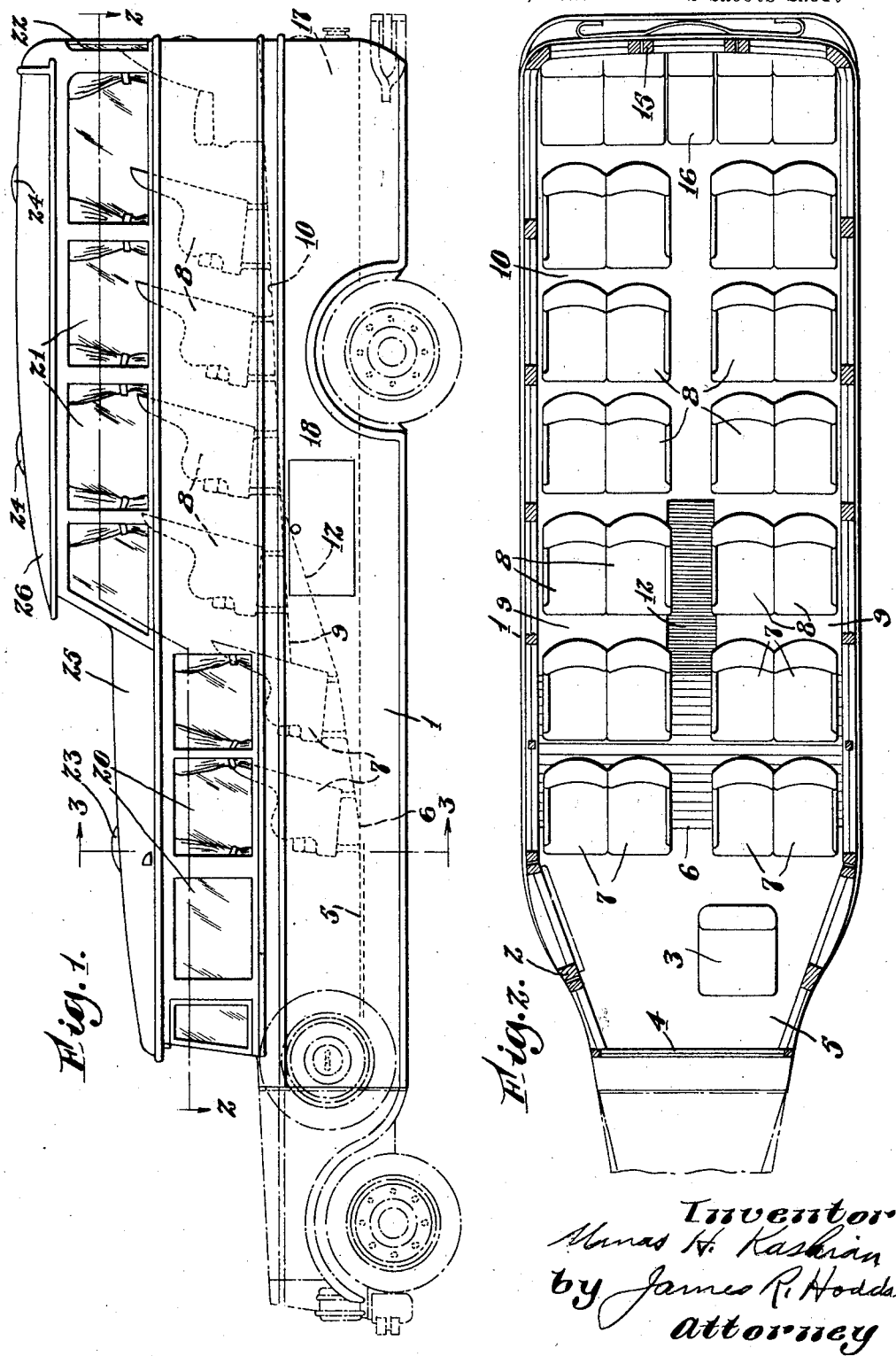

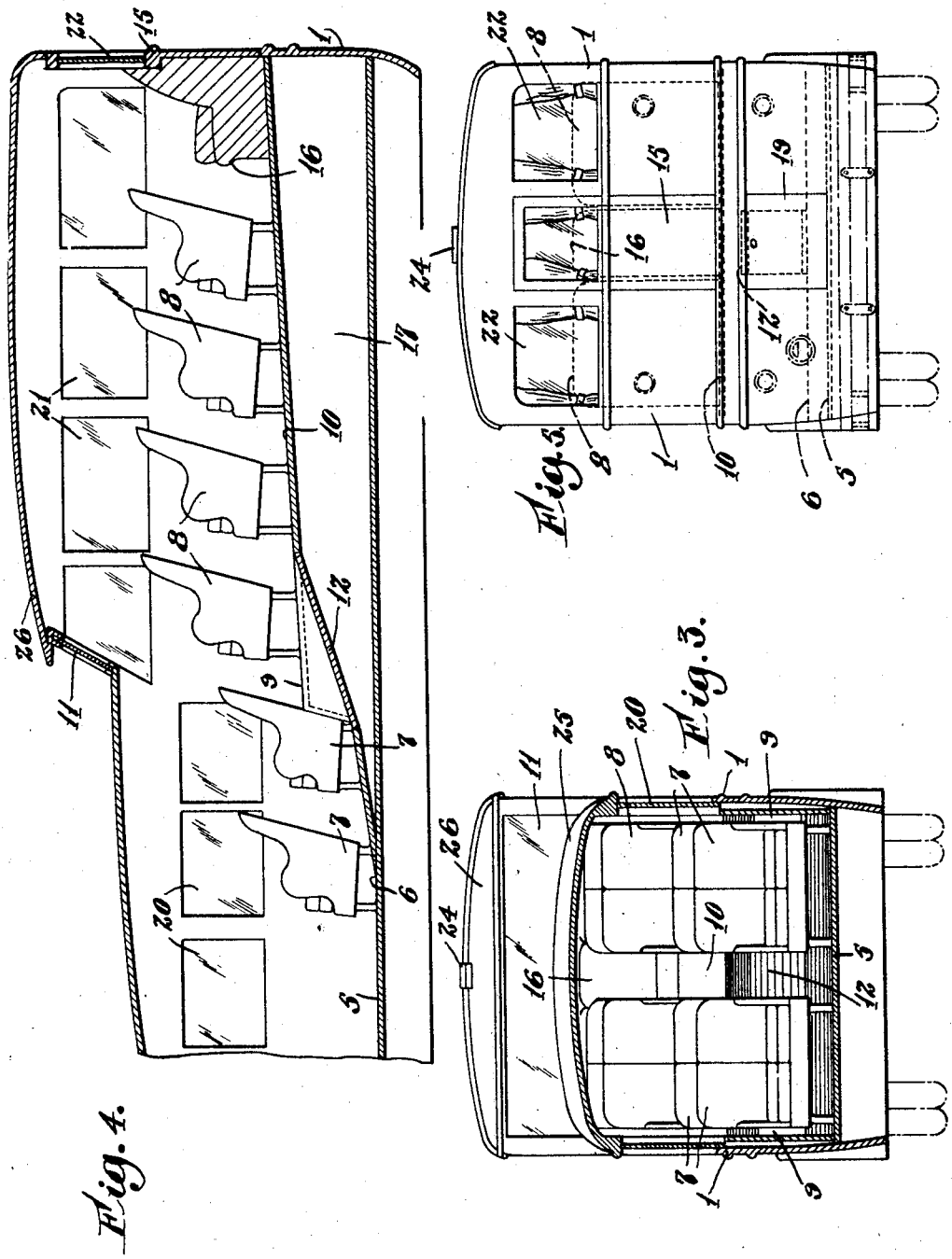

1,715,928

UNITED STATES PATENT OFFICE.

MINAS H. KASHIAN, OF BOSTON, MASSACHUSETTS.

AUTOMOBILE BODY.

Application filed March 24, 1928. Serial No. 264,449.

My present invention relates to automobiles, and more particularly to that type of automobile known as a passenger coach, or "bus", designed to accommodate a large number of passengers.

An important object of the present invention is to provide an automobile body, arranged with a plurality of pairs of transverse seats, and having each set or group of transverse seats elevated above the group or set of seats immediately in front thereof.

A further object of the invention is to provide such an automobile body with a transverse windshield or observation window, elevated above the normal height of the usual windshield, and to so construct the seating arrangement on the interior of the body that the greater portion of the seats will be to the rear of said higher windshield.

A further object of the invention is to provide a central ramp or aisle, free of steps, and yet constantly increasing in height from the front group of seats to the rearmost group of seats.

A further object of the invention consists in so arranging the seats that those passengers who will have vision through the usual or front windshield will have an unobstructed vision therethrough, and those passengers who will have vision through the secondary or uppermost windshield will also have an unobstructed vision therethrough. I accomplish this by graduating the seats in the front of the body but slightly, and then by elevating the entire rear portion or floor a considerable distance above the front floor, while at the same time graduating the seats on said rear floor from front to rear. In this manner an unobstructed vision is obtained by all of the passengers in the automobile.

An added feature and advantage obtained by constructing my novel automobile body with the main passenger compartment in the rear thereof, is the increased baggage-carrying capacity of said automobile, the baggage compartment of my present automobile body extending for more than two-thirds of the total length of said body, a plurality of doors, at both sides and rear, being provided for access to said baggage compartment.

The rear passenger compartment, or the rearmost seats of the rear passenger compartment may, of course, be utilized by passengers who desire to smoke, ventilators being provided in the overhead or roof to act as vents.

A rear door is provided, midway of the back of the body, which is generally only used as an emergency exit.

The above and other objects of the invention, details of construction, combinations of parts, and advantages, will be hereinafter more fully pointed out and claimed.

Referring to the drawings, illustrating a preferred embodiment of my invention,

Fig. 1 is a side elevation of an automobile embodying my novel body construction;

Fig. 2 is a longitudinal sectional view on the line 2—2 of Fig. 1;

Fig. 3 is a vertical sectional view on the line 3—3 of Fig. 1;

Fig. 4 is a longitudinal vertical sectional view of my novel automobile body; and Fig. 5 is a rear elevation of said automobile body.

Referring now to the drawings for a particular description of my invention, 1 designates generally my novel automobile body, having a forward entrance door 2 and driver's seat 3. The usual front windshield 4 is also provided. The floor 5 in the very front or operating compartment, is level, but commencing at 6 the floor is inclined upwardly toward the rear, and on this inclined floor are arranged pairs of seats 7, 7, two sets of these seats being utilized in the forward compartment, and the rear pair of seats being elevated, because of the inclined floor, so that the occupants of the said rear pairs of seats will have a vision over the heads of the passengers in the pairs of seats immediately in front thereof. The central aisle of the body also inclines or slopes at the same inclination as the floor of the body. The next rearward pairs of seats 8, 8, are positioned on steps 9, and are elevated a considerable distance above the seats 7, 7, in the forward compartment. These steps 9 are in reality forward extensions of the rear floor 10 of the rear compartment, and the said floor, including the steps or extensions 9, is gradually inclined toward the rear of the body, each succeeding set of seats being thus elevated slightly above the preceding set of seats a sufficient distance to permit vision of the passengers in the rear compartment through the secondary windshield 11. The central aisle, instead of being provided with steps, is inclined sharply, as illustrated at 12, from the second set of seats to the rear floor, thus providing easy access to this rear compartment without the exertion of walking up stairs. This steep inclination of the aisle is also sufficient far back so that the passengers will be assured of ample headroom at all times when passing from the front to the rear or elevated compartment.

The rear emergency exit or door 15 is provided, being preferably midway of the back of the body, the central rear seat, 16, being removable for access to said door.

The baggage compartment 17, as clearly illustrated, affords a large carrying capacity, and extends more than two-thirds of the length of the automobile, access to this compartment being provided through side doors 18 and a rear door 19.

Side windows 20 in the forward compartment, and 21 in the rear or elevated compartment, are provided, as well as rear windows 22 in the rear compartment, for full side and rear vision. Ventilators 23 in the roof 25 of the forward compartment, and 24 in the roof 26 of the rear or elevated compartment, are also provided.

It will thus be appreciated that I have devised an automobile body having many novel and advantageous features, including the features of comfort and increased vision to the passengers, and since I believe that this automobile body is novel, I have claimed the same broadly in the present application.

While I have necessarily described my present invention somewhat in detail, it will be appreciated that I may vary the size, shape and arrangement of parts within reasonably wide limits without departing from the spirit of the invention.

My invention is further described and defined in the form of claims as follows:

1. In an automobile body, a passenger compartment located toward the forward end, another and main passenger compartment located toward the rear end, transverse sets of seats in each of said compartments, an inclined floor in said forward compartment on which certain of said sets of seats are mounted, an inclined floor in said rear compartment on which others of said sets of seats are mounted, each set of seats thus being on a higher level than the set of seats immediately in front thereof, and a central aisle, inclining with the incline of the floor of the forward compartment, then inclining more sharply to meet the inclined floor of the rear compartment, and then inclining with the incline of the floor of said rear compartment, said inclined floor of said rear compartment extending forwardly and at each side of said sharp inclination in said aisle, and one set of said transverse seats being located on said forward extensions of said rear floor.

2. In an automobile body, a passenger compartment located toward the forward end, another and main passenger compartment located toward the rear end, transverse sets of seats in each of said compartments, an inclined floor in said forward compartment on which certain of said sets of seats are mounted, an inclined floor in said rear compartment on which others of said sets of seats are mounted, each set of seats thus being on a higher level than the set of seats immediately in front thereof, and a central aisle, inclining with the incline of the floor of the forward compartment, then inclining more sharply to meet the inclined floor of the rear compartment, and then inclining with the incline of the floor of said rear compartment, said inclined floor of said rear compartment extending forwardly and at each side of said sharp inclination in said aisle, and one set of said transverse seats being located on said forward extensions of said rear floor, and a windshield in the front of said rear compartment, each passenger in the rear compartment having a clear vision through said windshield because of the graduated arrangement of said seats.

3. In an automobile body, a passenger compartment located toward the forward end, another and main passenger compartment located toward the rear end, transverse sets of seats in each of said compartments, a floor in said forward compartment on which certain of said sets of seats are mounted, a floor in said rear compartment on which others of said sets of seats are mounted, and a central aisle inclining to meet the floor of the rear compartment, said floor of said rear compartment extending forwardly and at each side of said inclination in said aisle, and one set of said transverse seats being located on each forward extension of said rear floor.

In testimony whereof, I have signed my name to this specification.

MINAS H. KASHIAN.